US008290287B2

(12) United States Patent
Hamid

(10) Patent No.: US 8,290,287 B2
(45) Date of Patent: Oct. 16, 2012

(54) METHOD FOR DISPLAYING ENCODED IMAGE DATA

(76) Inventor: Laurence Hamid, Ottawa (CA)

(*) Notice: Subject to any disclaimer, the term of this patent is extended or adjusted under 35 U.S.C. 154(b) by 419 days.

(21) Appl. No.: 12/706,304

(22) Filed: Feb. 16, 2010

(65) Prior Publication Data

US 2010/0226585 A1 Sep. 9, 2010

Related U.S. Application Data

(60) Provisional application No. 61/158,490, filed on Mar. 9, 2009.

(51) Int. Cl.
G06K 9/36 (2006.01)
G06K 9/46 (2006.01)

(52) U.S. Cl. ...................................................... 382/233

(58) Field of Classification Search .................. 382/100, 382/233, 321; 380/44, 46, 47, 255, 263, 380/268, 270, 272, 273, 277; 358/85, 86, 358/400–407; 708/250, 253, 255, 256, 490; 713/186; 347/2, 16, 19, 225
See application file for complete search history.

(56) References Cited

U.S. PATENT DOCUMENTS

| 6,122,403 | A  | * | 9/2000 | Rhoads | 382/233 |
|---|---|---|---|---|---|
| 6,219,793 | B1 | * | 4/2001 | Li et al. | 726/19 |
| 7,170,997 | B2 | * | 1/2007 | Petersen et al. | 380/268 |
| 7,452,048 | B2 | * | 11/2008 | Silverbrook | 347/16 |
| 7,499,567 | B2 | * | 3/2009 | Shimosato | 382/100 |
| 7,653,200 | B2 | * | 1/2010 | Karmi et al. | 380/270 |
| 8,023,649 | B2 | * | 9/2011 | Mihaljevic et al. | 380/46 |
| 2008/0072063 | A1 | * | 3/2008 | Takahashi et al. | 713/186 |
| 2009/0092251 | A1 | * | 4/2009 | Domosi | 380/255 |
| 2010/0226585 | A1 | * | 9/2010 | Hamid | 382/233 |

* cited by examiner

Primary Examiner — Amir Alavi
(74) Attorney, Agent, or Firm — Freedman & Associates

(57) ABSTRACT

A method for displaying encoded image data includes providing data in an encoded form, the data when displayed forming a two-dimensional image. Using a decoding cellular automaton rule and a predetermined secret key, the data is processed through a plurality of iterations to obtain the data in a non-encoded form. A series of images resulting from the processing, and ending in the two-dimensional image, is displayed in time-sequence. The series of images contains information that is insufficient for determining the secret key, given knowledge of each one of the decoding cellular automaton rule, the data in the encoded form and the data in the non-encoded form.

29 Claims, 5 Drawing Sheets

METHOD FOR DISPLAYING ENCODED IMAGE DATA

This application claims benefit of 61/158,490 filed on Mar. 9, 2009.

FIELD OF THE INVENTION

The invention relates generally to encoding and decoding image data, and more particularly to a method for displaying obfuscated image data when decoding an image according to a cellular automaton rule.

BACKGROUND OF THE INVENTION

The use of portable electronic devices has increased dramatically in recent years, and many such devices now support the capability to capture, transmit and display electronic image data. In addition, personal computers, laptop computers, game consoles, etc. are also used extensively for exchanging and displaying image data. In some cases, the image data relates to a "digital picture" that is captured using an image sensor, such as for instance a charge-coupled device (CCD) or a complementary metal-oxide-semiconductor (CMOS) based image sensor. In other cases, the image data relates to a picture, sketch, symbol, handwriting or printing that is "hand-drawn" by a user, using for instance a stylus and tablet, a mouse or a touch screen. Of course, the image data in some cases relates to typed text. In general, the image data forms a two-dimensional image when displayed via a display portion of an electronic display device.

It is often the case that the image data is private or confidential in nature. In such cases it is desirable to encode the image data prior to transmission or storage thereof. Image encoding schemes that are based on cellular automaton rules are particularly attractive, since the decoded image is identical to the original image and there is no loss of resolution. Briefly, a cellular automaton (CA) is a discrete dynamical system formed by a finite or infinite number of identical objects called cells, which are endowed with a state that changes in discrete time steps according to a deterministic rule. In general, the evolution of a CA considers that the state of a specified cell at time t+1 depends on the state of its neighbourhood at time t, where the neighbourhood is a selection of cells relative to the specified cell. However, this evolution can also be considered to depend on the states of other cells at times t−1, t−2, etc. Every cell has the same rule for updating, based on the values in this neighbourhood. Each time the rules are applied to the whole system a new generation—iteration—is created.

Considering now a specific example, in which the image data is to be encoded for transmission via a network, the following steps typically are performed. The image data is processed through a predetermined number of iterations using a predetermined CA rule and a secret key. Each iteration results in new data, which is then processed further during a next iteration. The encoded image data is obtained at the end of the final iteration, and is transmitted subsequently via a communications network to a receiver. At the receiver end the encoded image data is processed through a same predetermined number of iterations, using the inverse of the predetermined CA rule with knowledge of the secret key. The image data, in decoded form, is obtained after the final iteration and the image data is then displayed using, for instance, a display portion of an electronic display device that is associated with the receiver.

Many applications, particularly messaging applications, provide enhanced enjoyment for the user when unusual visual effects are employed. The use of CA based encoding/decoding of image data provides an opportunity to add such an unusual effect. In particular, the iterative processing of the encoded image data using the CA rule and secret key produces data that, when displayed to the user, appears as a series of obfuscated images that coalesce eventually into the plain image. In other words, the received image emerges gradually from chaos rather than being displayed to the user all at once. Unfortunately, given knowledge of the CA rule, the encoded data and the decoded data, it may be possible for an unauthorized entity to use the series of obfuscated images—iterations or generations—to determine the secret key. As such, displaying the series of obfuscated images renders the encoding/decoding scheme much less secure.

It would therefore be beneficial to provide a method that overcomes at least some of the above mentioned limitations.

SUMMARY OF EMBODIMENTS OF THE INVENTION

In accordance with an aspect of the invention there is provided a method comprising: providing data in an encoded form, the data when displayed forming a two-dimensional image; using a decoding cellular automaton rule and a predetermined secret key, processing the data through a plurality of iterations to obtain the data in a non-encoded form; and, displaying in time-sequence a series of images resulting from the processing, the series of images ending in the two-dimensional image and containing information that is insufficient for determining the secret key, given knowledge of each one of the decoding cellular automaton rule, the data in the encoded form and the data in the non-encoded form.

In accordance with an aspect of the invention there is provided a method comprising: providing data in an encoded form, the data when displayed forming a two-dimensional image; using a decoding cellular automaton rule and a predetermined secret key, processing the data through N iterations, one of the N iterations resulting in data that when displayed forms the two-dimensional image and each of the other N-1 iterations resulting in data that when displayed forms a different obfuscated version of the two-dimensional image; and, displaying in time-sequence a series of images including fewer than N-1 different obfuscated versions of the two-dimensional image and ending in the two-dimensional image, the series of images containing information that is insufficient for determining the secret key, given knowledge of each one of the cellular automaton rule, the data in the encoded form and the data in the non-encoded form.

In accordance with an aspect of the invention there is provided a method comprising: providing data in an encoded form, the data when displayed forming a two-dimensional image; using a decoding cellular automaton rule and a predetermined secret key, processing the data through N iterations, one of the N iterations resulting in data that when displayed forms the two-dimensional image and each of the other N-1 iterations resulting in data that when displayed forms a different obfuscated version of the two-dimensional image; cropping the obfuscated version of the two-dimensional image resulting from at least some of the N-1 iterations, so as to produce a series of cropped image; and, displaying in time-sequence a series of images including the series of cropped image and ending in the two-dimensional image, the series of images containing information that is insufficient for determining the secret key, given knowledge of each one of the cellular automaton rule, the data in the encoded form and the data in the non-encoded form.

In accordance with an aspect of the invention there is provided a method comprising: receiving from a remote system, via a communications network, an electronic message comprising data that is encoded based on a predetermined secret key and according to an encoding cellular automaton rule, the data for use with an electronic display device for forming a two-dimensional image; using a decoding cellular automaton rule and the predetermined secret key, processing the data through a plurality of iterations to obtain the data in a non-encoded form; and, displaying in time-sequence, via the electronic display device, a series of images resulting from the processing, the series of images ending in the two-dimensional image and containing information that is insufficient for determining the secret key, given knowledge of each one of the decoding cellular automaton rule, the data in the encoded form and the data in the non-encoded form.

BRIEF DESCRIPTION OF THE DRAWINGS

Exemplary embodiments of the invention will now be described in conjunction with the following drawings, in which.

DETAILED DESCRIPTION OF EMBODIMENTS OF THE INVENTION

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the invention. Thus, the present invention is not intended to be limited to the embodiments disclosed, but is to be accorded the widest scope consistent with the principles and features disclosed herein.

Embodiments of the instant invention are described hereinbelow using an electronic messaging system as a specific and non-limiting example. In an illustrative electronic messaging system, two-dimensional image data is transmitted in encoded form between a sender and a recipient, via a communications network such as for instance the Internet of the World Wide Web. Of course, embodiments of the instant invention may also be applied to other systems in which image data is stored locally in an encoded form, without the encoded image data being transmitted via an external communications network. In each of the above-mentioned systems, the encoded image data at some point is decoded and displayed to a user via a display portion of an electronic display device. Suitable electronic display devices include, but are not limited to, smart phones, personal data assistants (PDAs), portable gaming devices, personal computers, laptop computers, game consoles, etc.

Figure 1:
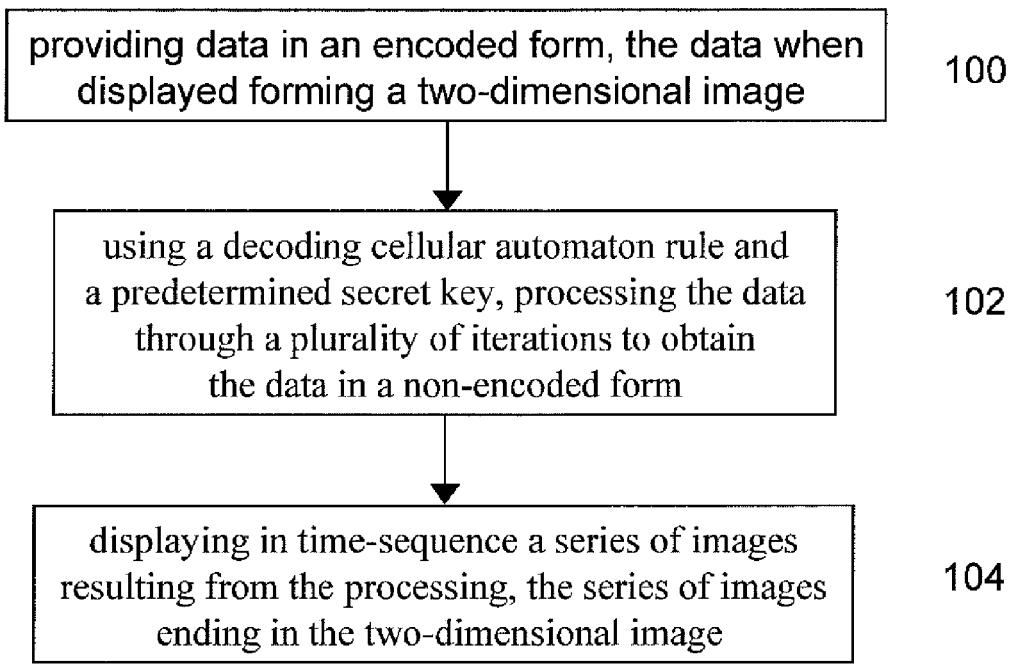
FIG. 1 is a simplified flow diagram of a method according to an embodiment of the instant invention.

Referring now to FIG. 1, a simplified flow diagram of a method according to an embodiment of the instant invention is shown. Image data in encoded form is provided at step 100. The image data, when displayed via a display portion of an electronic display device, forms a two-dimensional image. Using a decoding CA rule and a secret key, the data is processed at step 102 through a plurality of iterations, so as to obtain the image data in non-encoded form. At step 104 a series of images resulting from the processing is displayed in time-sequence. The series of images ends in the two-dimensional image and contains information that is insufficient for determining the secret key that was used initially to encode the image data. Thus, given knowledge of each one of the decoding cellular automaton rule, the data in the encoded form and the data in the non-encoded form, an unauthorized user still is not able to determine or reverse engineer the secret key.

The processing that is performed at step 102 makes use of a decoding CA rule and a secret key. In particular, the decoding CA rule is the inverse of an encoding CA rule. The encoding CA rule is used initially in combination with the secret key to encode the image data prior to transmission via the communications network. The decoding process is the reverse of the encoding process, both processes being performed for a same number of iterations. The encoding process also uses a reversible process for combining the secret key with the image data.

By way of a specific and non-limiting example, encoding the image data involves processing the image data through a first predetermined number of iterations, or time-steps, using the encoding CA rule. Next, the data that is obtained after the first predetermined number of iterations is combined with the secret key according to a reversible operation, such as for instance an XOR operation. Optionally, an operation other than the XOR operation is used with the secret key. For instance, bits are swapped according to the secret key or the secret key is used to process some or all bits within the image in a predetermined reversible fashion. Finally, the resulting data is processed through a second predetermined number of iterations, resulting in the encoded image data. Alternatively, the secret key is used either prior to or subsequent to processing the data through all iterations using the encoding CA rule.

In order to subsequently decode the encoded image data, the encoded image data is processed through the second predetermined number of iterations, the secret key is applied using the reverse of the combining operation, and finally the data is processed further through the first predetermined number of iterations using the decoding CA rule. The series of images that is displayed at step 104 includes a plurality of different obfuscated versions of the two-dimensional image, and ends with the original two-dimensional image. In particular, each of obfuscated versions of the two-dimensional image is displayed based on the data that is obtained at the end of one of the processing iterations of step 102.

In order to prevent an unauthorized user from recording the series of images and using the recorded information to deduce the secret key, the images are displayed in such a way that insufficient information is provided for determining the secret key. In one approach, the data resulting from some of the processing iterations of step 102 are not used for displaying an image. Accordingly, the series of images that is displayed to the user results in gaps in the decoding process. In a second approach, the data resulting from some of the processing iterations of step 102 are cropped, such that the series of images that is displayed to the user includes at least some cropped images. Though the term cropped is used, optionally, a section of the processed data is outside the viewable window of the image data and of that shown during processing to result in "cropping" of the CA data without cropping of the final image. Optionally, the first approach and the second approach are combined. The series of images is displayed to the user in time-sequence, one image after another, within a same display portion of an electronic display device. Accordingly, a currently displayed image is replaced with a next image such that, at the end of the series, the two-dimensional image coalesces and becomes recognizable.

In the instant example the encoded image data is provided from a sender to a receiver via a communications network. Alternatively, the encoded image data is provided from a memory storage location absent transmission via an external communications network.

Figure 2:
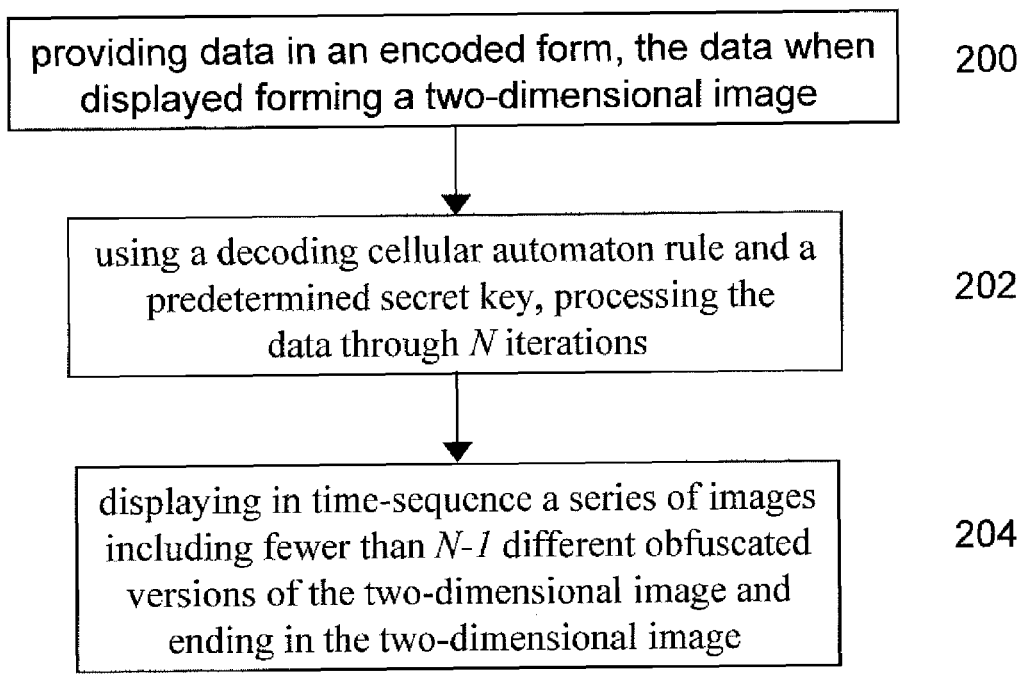
FIG. 2 is a simplified flow diagram of a method according to an embodiment of the instant invention.

Referring now to FIG. 2, a simplified flow diagram of a method according to an embodiment of the instant invention is shown. At step 200, image data in encoded form is provided. The image data, when displayed via a display portion of an electronic display device, forms a two-dimensional image. Using a decoding CA rule and a secret key, the data is processed at step 202 through N iterations, one of the N iterations resulting in data in non-encoded form that when displayed forms the two-dimensional image, and each of the other N-1 iterations resulting in data that when displayed forms a different obfuscated version of the two-dimensional image. At step 204 a series of images resulting from the processing is displayed in time-sequence. The series of images includes fewer than N-1 different obfuscated versions of the two-dimensional image and ends in the two-dimensional image. Accordingly, the series of images contains information that is insufficient for determining the secret key, given knowledge of each one of the cellular automaton rule, the data in the encoded form and the data in the non-encoded form.

The processing that is performed at step 202 makes use of a decoding CA rule and a secret key. In particular, the decoding CA rule is the inverse of an encoding CA rule. The encoding CA rule is used initially, in combination with the secret key, to encode the image data prior to transmission via the communications network. The decoding process is the reverse of the encoding process, both processes being performed for a same number of iterations. The encoding process also uses a reversible process for combining the secret key with the image data.

By way of a specific and non-limiting example, encoding the image data involves processing the image data through a first predetermined number of iterations, or time-steps, using the encoding CA rule. Next, the data that is obtained after the first predetermined number of iterations is combined with the secret key according to a reversible operation, such as for instance an XOR operation. Optionally, an operation other than the XOR operation is used with the secret key. For instance, bits are swapped according to the secret key or the secret key is used to process some or all bits within the image in a predetermined reversible fashion. Finally, the resulting data is processed through a second predetermined number of iterations, resulting in the encoded image data. Alternatively, the secret key is used either prior to or subsequent to processing the data through all iterations using the encoding CA rule.

In order to subsequently decode the encoded image data, the encoded image data is processed through the second predetermined number of iterations, the secret key is used in reverse of the combining operation, and finally the data is processed further through the first predetermined number of iterations using the decoding CA rule. The series of images that is displayed at step 204 includes a plurality of different obfuscated versions of the two-dimensional image, and ends with the original two-dimensional image. In particular, each of obfuscated versions of the two-dimensional image is displayed based on the data that is obtained at the end of one of the processing iterations of step 202.

In order to prevent an unauthorized user from recording the series of images and using the recorded information to deduce the secret key, the images are displayed in such a way that insufficient information is provided for determining the secret key. In particular, the data resulting from some of the processing iterations of step 202 are not used for displaying an image. Accordingly, the series of images that is displayed to the user results in gaps in the decoding process. Optionally, at least some images of the series of are cropped. The series of images is displayed to the user in time-sequence, one image after another, within a same display portion of an electronic display device. Accordingly, a currently displayed image is replaced with a next image such that, at the end of the series, the two-dimensional image coalesces and becomes recognizable.

In the instant example the encoded image data is provided from a sender to a receiver via a communications network. Alternatively the encoded image data is provided from a memory storage location absent transmission via an external communications network.

Figure 3:
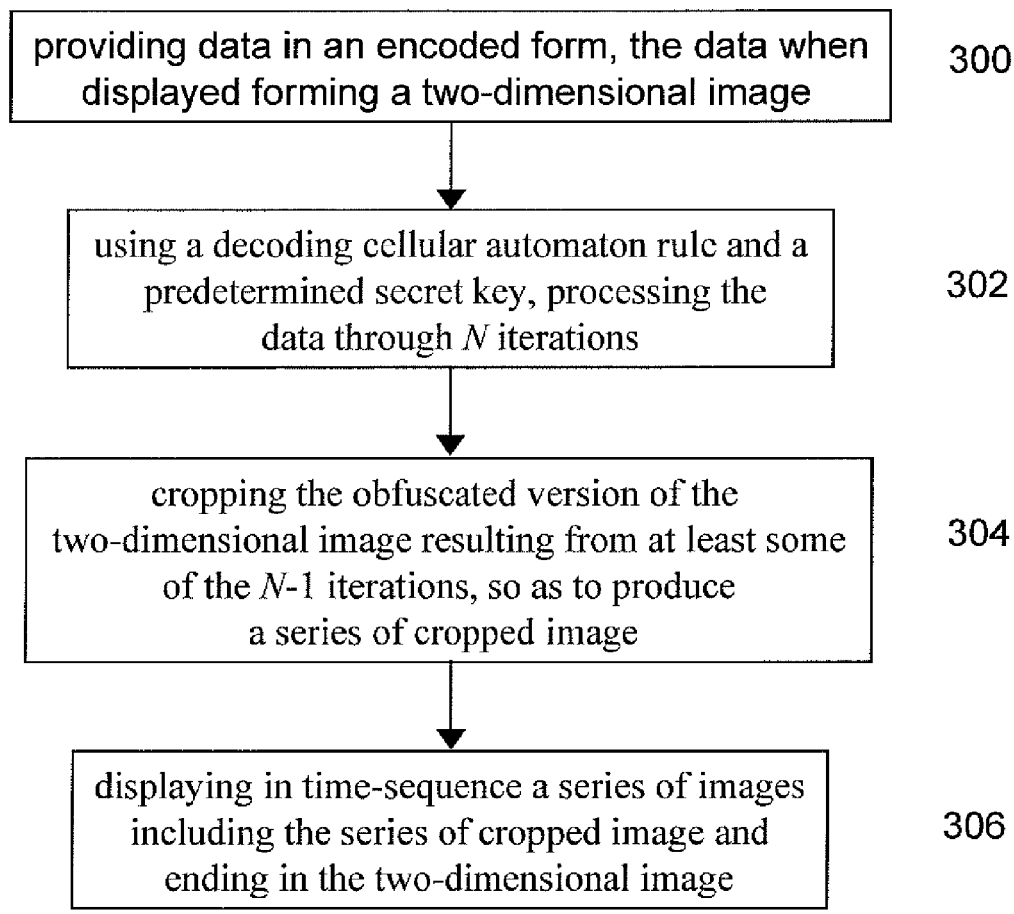
FIG. 3 is a simplified flow diagram of a method according to an embodiment of the instant invention.

FIG. 3 is a simplified flow diagram of a method according to an embodiment of the instant invention. At step 300, image data in encoded form is provided. The image data, when displayed via a display portion of an electronic display device, forms a two-dimensional image. Using a decoding CA rule and a predetermined secret key, the data is processed at step 302 through N iterations, one of the N iterations resulting in data that when displayed forms the two-dimensional image and each of the other N-1 iterations resulting in data that when displayed forms a different obfuscated version of the two-dimensional image. At step 304 the obfuscated version of the two-dimensional image resulting from at least some of the N-1 iterations are cropped, so as to produce a series of cropped images. At step 306 a series of images resulting from the processing is displayed in time-sequence, the series of images including the series of cropped images and ending in the two-dimensional image. The series of images provides information that is insufficient for determining the secret key, given knowledge of each one of the cellular automaton rule, the data in the encoded form and the data in the non-encoded form.

The processing that is performed at step 302 makes use of a decoding CA rule and a secret key. In particular, the decoding CA rule is the inverse of an encoding CA rule. The encoding CA rule is used initially, in combination with the secret key, to encode the image data prior to transmission via the communications network. The decoding process is the reverse of the encoding process, both processes being performed for a same number of iterations. The encoding process also uses a reversible process for combining the secret key with the image data.

By way of a specific and non-limiting example, encoding the image data involves processing the image data through a first predetermined number of iterations, or time-steps, using the encoding CA rule. Next, the data that is obtained after the first predetermined number of iterations is combined with the secret key according to a reversible operation, such as for instance an XOR operation. Optionally, an operation other than the XOR operation is used with the secret key. For instance, bits are swapped according to the secret key or the secret key is used to process some or all bits within the image in a predetermined reversible fashion. Finally, the resulting data is processed through a second predetermined number of iterations, resulting in the encoded image data. Alternatively, the secret key is used either prior to or subsequent to processing the data through all iterations using the encoding CA rule.

In order to subsequently decode the encoded image data, the encoded image data is processed through the second predetermined number of iterations, the secret key is extracted using the reverse of the combining operation, and finally the data is processed further through the first predetermined number of iterations using the decoding CA rule. The series of images that is displayed at step 306 includes a plurality of different obfuscated versions of the two-dimensional image, and ends with the original two-dimensional image. In particular, each of obfuscated versions of the two-dimensional image is displayed based on the data that is obtained at the end of one of the processing iterations of step 306.

In order to prevent an unauthorized user from recording the series of images and using the recorded information to deduce the secret key, the images are displayed in such a way that insufficient information is provided for determining the secret key. In particular, the data resulting from some of the processing iterations of step 302 are cropped at step 304, so as to produce a cropped image for display at step 306. Accordingly, the series of images that is displayed to the user includes images that contain less than the full data result for at least some of the processing iterations of step 302. Optionally, images based on data resulting from some of the processing iterations are not displayed. The series of images is displayed to the user in time-sequence, one image after another, within a same display portion of an electronic display device. Accordingly, a currently displayed image is replaced with a next image such that, at the end of the series, the two-dimensional image coalesces and becomes recognizable.

In the instant example the encoded image data is provided from a sender to a receiver via a communications network. Alternatively the encoded image data is provided from a memory storage location absent transmission via an external communications network.

Figure 4:
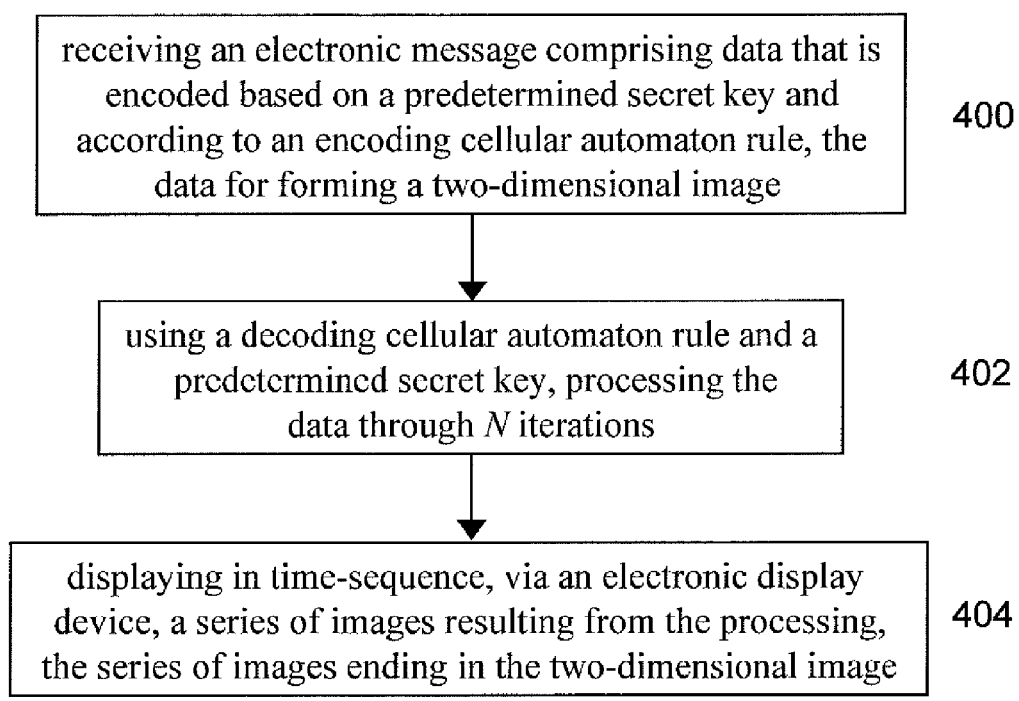
FIG. 4 is a simplified flow diagram of a method according to an embodiment of the instant invention; and, FIG. 5 is a simplified diagram showing display of obfuscated image data and plain image data, in time sequence, via a display of a portable electronic device.

FIG. 4 is a simplified flow diagram of a method according to an embodiment of the instant invention. At step 400 an electronic message is received from a remote system, via a communications network, the electronic message comprising data that is encoded based on a predetermined secret key and according to an encoding cellular automaton rule. In particular, the data is for use with an electronic display device for forming a two-dimensional image. At step 402, using a decoding cellular automaton rule and the predetermined secret key, the data is processed through a plurality of iterations to obtain the data in a non-encoded form. At step 404 a series of images resulting from the processing is displayed in time-sequence, via the electronic display device. The series of images ends in the two-dimensional image and contains information that is insufficient for determining the secret key that was used initially to encode the image data. Thus, given knowledge of each one of the decoding cellular automaton rule, the data in the encoded form and the data in the non-encoded form, an unauthorized user still is not able to determine or reverse engineer the secret key.

The processing that is performed at step 402 makes use of a decoding CA rule and a secret key. In particular, the decoding CA rule is the inverse of an encoding CA rule. The encoding CA rule is used initially, in combination with the secret key, to encode the image data prior to transmission via the communications network. The decoding process is the reverse of the encoding process, both processes being performed for a same number of iterations. The encoding process also uses a reversible process for combining the secret key with the image data.

By way of a specific and non-limiting example, encoding the image data involves processing the image data through a first predetermined number of iterations, or time-steps, using the encoding CA rule. Next, the data that is obtained after the first predetermined number of iterations is combined with the secret key according to a reversible operation, such as for instance an XOR operation. Optionally, an operation other than the XOR operation is used with the secret key. For instance, bits are swapped according to the secret key or the secret key is used to process some or all bits within the image in a predetermined reversible fashion. Finally, the resulting data is processed through a second predetermined number of iterations, resulting in the encoded image data. Alternatively, the secret key is used either prior to or subsequent to processing the data through all iterations using the encoding CA rule.

In order to subsequently decode the encoded image data, the encoded image data is processed through the second predetermined number of iterations, the secret key is extracted using the reverse of the combining operation, and finally the data is processed further through the first predetermined number of iterations using the decoding CA rule. The series of images that is displayed at step 404 includes a plurality of different obfuscated versions of the two-dimensional image, and ends with the original two-dimensional image. In particular, each of obfuscated versions of the two-dimensional image is displayed based on the data that is obtained at the end of one of the processing iterations of step 402.

In order to prevent an unauthorized user from recording the series of images and using the recorded information to deduce the secret key, the images are displayed in such a way that insufficient information is provided for determining the secret key. In one approach, the data resulting from some of the processing iterations of step 402 are not used for displaying an image. Accordingly, the series of images that is displayed to the user results in gaps in the decoding process. In a second approach, the data resulting from some of the processing iterations of step 402 are cropped, such that the series of images that is displayed to the user includes at least some cropped images. Optionally, the first approach and the second approach are combined. The series of images is displayed to the user in time-sequence, one image after another, within a same display portion of an electronic display device. Accordingly, a currently displayed image is replaced with a next image such that, at the end of the series, the two-dimensional image coalesces and becomes recognizable.

In the instant example the encoded image data is provided from a sender to a receiver via a communications network. Alternatively the encoded image data is provided from a memory storage location absent transmission via an external communications network.

Figure 5:
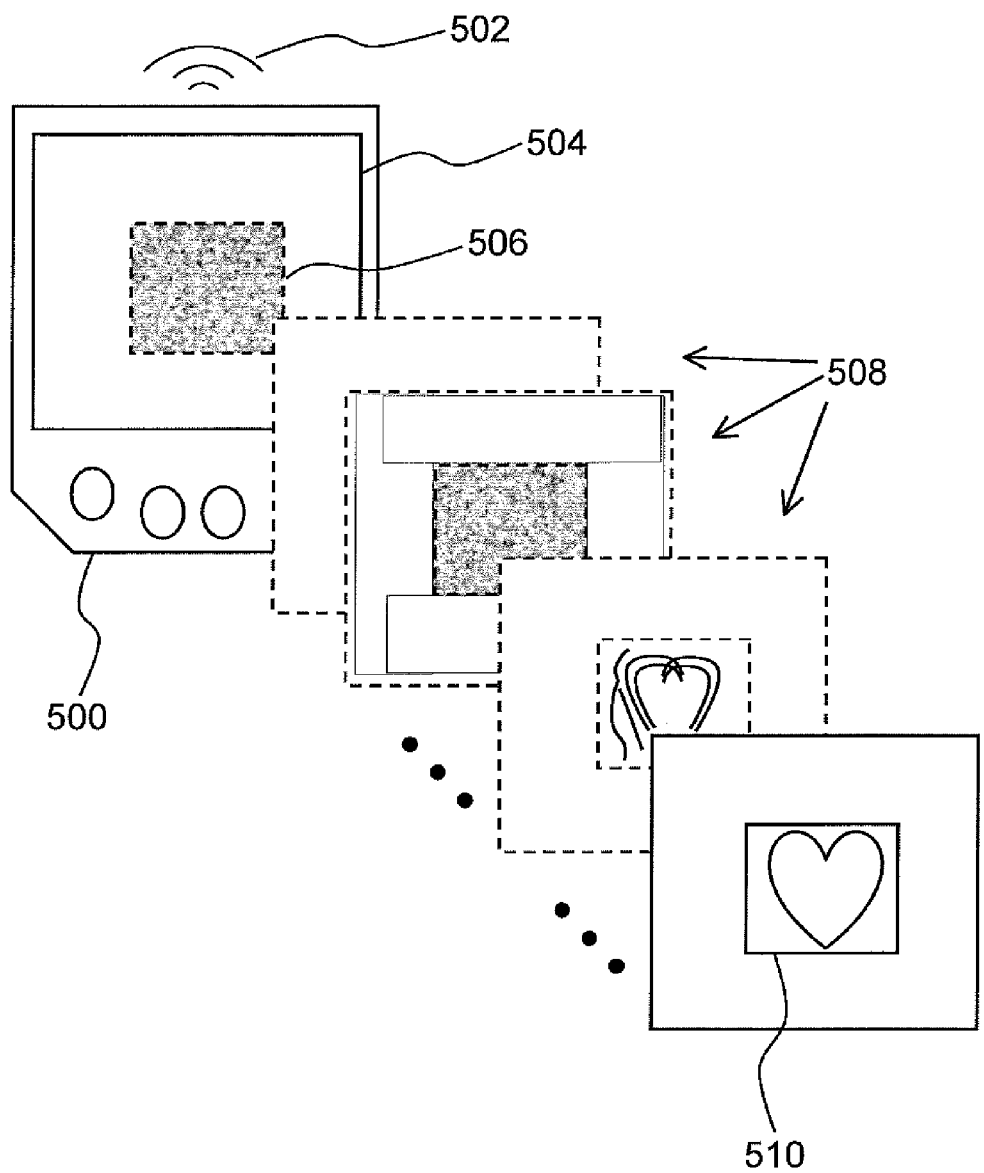

Referring now to FIG. 5, illustrated is a simplified diagram showing the display of obfuscated image data and plain image data, in time sequence, via a display portion of a portable electronic device. In the specific and non-limiting example that is shown in FIG. 5, a portable electronic device in the form of a PDA, smart phone or portable gaming device is shown. Optionally, another type of portable electronic device, such as for instance a laptop computer, is used. Further optionally, a personal computer or another non-portable electronic device is used.

The portable electronic device 500 includes a transceiver 502 for wirelessly receiving and transmitting data. A display portion 504 is also provided for displaying image data to a user that is associated with the device 500. In FIG. 5, an obfuscated version of a two-dimensional image is displayed initially within display area 506 of the display portion 504. In particular, the obfuscated version of the two-dimensional image is based on received data that was encoded previously using an encoding CA rule and a secret key. When the received data is decoded, using a decoding CA rule and the secret key, a series of images including images 508 and ending in the two-dimensional image 510 are displayed in time sequence via the display portion 504 of the device 500. Each successive image of the series is displayed within the display area 506, such that the images transition one to another until eventually the two-dimensional image begins to coalesce and eventually emerges, as is shown in image 510.

As discussed with reference to FIGS. 1-4, the images that are displayed using device 500 contain information that is insufficient for determining the secret key that was used initially to encode the image data. Thus, given knowledge of each one of the decoding cellular automaton rule, the data in the encoded form and the data in the non-encoded form, an unauthorized user still is not able to determine or reverse engineer the secret key. By way of a few non-limiting examples, the displayed images are either cropped such that some of the image data is not displayed, or images resulting from some iterations of the decoding processing are omitted entirely from the display sequence. Optionally, some images are omitted from the display sequence, and at least some of the displayed images are cropped.

The image 510 that is displayed at the end of the series of images is identical to the original two-dimensional image. The image can be viewed in plain form only with knowledge of the secret key, and the secret key cannot be determined based on the series of images that are displayed. The series of images optionally is displayed in real-time as the encoded image data is being decoded, each image being displayed for a relatively short duration of time. Optionally, fewer image transitions are allowed, such that each image is displayed for a relatively longer duration of time. For instance, between 10 and 30 transitions per second is sufficient to create an impression of relatively smoothly changing image display.

A methodology for obfuscating use of the secret key involves applying the secret key to frames that are not shown to the end user during encoding or decoding and applying of the secret key to more than one frame either in whole or in part. Thus, for example, if the secret key were divided into two secret key portions and a number of iterations into the CA process the first secret key portion is applied and then a number of iterations later the second secret key portion is applied wherein the CA iteration results from application of the first secret key portion to application of the second secret key portion are not shown to a user, then the resulting cellular automata decoding/encoding process is difficult to use to determine the secret key. Further, if the secret key itself is determinative of a number of iterations between application of the first secret key portion and the second secret key portion determining the secret key is further secured.

Numerous other embodiments may be envisaged without departing from the spirit or scope of the invention.

What is claimed is:

1. A method comprising:
   providing data in an encoded form, the data when displayed forming a two-dimensional image;
   using a decoding cellular automaton rule and a predetermined secret key, processing the data through a plurality of iterations to obtain the data in a non-encoded form; and,
   displaying in time-sequence a series of images resulting from the processing, the series of images ending in the two-dimensional image and containing information that is insufficient for determining the secret key, given knowledge of each one of the decoding cellular automaton rule, the data in the encoded form and the data in the non-encoded form.

2. A method according to claim 1, wherein each one of the first through the penultimate processing iterations results in data that, when displayed, forms an obfuscated version of the two-dimensional image.

3. A method according to claim 2, wherein the series of images comprises images that are based on data resulting from some of the processing iterations, each of said images being a different obfuscated version of the two-dimensional image.

4. A method according to claim 2, wherein displaying in time-sequence the series of images comprises displaying the obfuscated version of the two-dimensional image resulting from each processing iteration of a discontinuous sub-set of the plurality of processing iterations.

5. A method according to claim 2, wherein displaying in time-sequence the series of images comprises:
   cropping the obfuscated version of the two-dimensional image resulting from at least one of the processing iterations; and,
   displaying the resulting cropped obfuscated version of the two-dimensional image as one of the images of the series of images.

6. A method according to claim 1, wherein the data is processed through N iterations, and wherein the series of images includes fewer than N images.

7. A method according to claim 1, wherein the data that is provided in the encoded form is encoded using an encoding cellular automaton rule and the predetermined secret key.

8. A method according to claim 7, wherein the decoding cellular automaton rule is the inverse of the encoding cellular automaton rule.

9. A method according to claim 1, wherein displaying in time-sequence the series of images comprises displaying each image of the series of images within a same display portion of an electronic display device, the images being displayed one at a time to a user of the electronic display device such that the two-dimensional image coalesces at the end of displaying the series of images.

10. A method according to claim 1, wherein providing data in the encoded form comprises:
    receiving from a remote system, via a communications network, an electronic message comprising data that is encoded based on a predetermined secret key and according to an encoding cellular automaton rule; and,
    providing the data to a processor that is in communication with an electronic display device.

11. A method comprising:
    providing data in an encoded form, the data when displayed forming a two-dimensional image;
    using a decoding cellular automaton rule and a predetermined secret key, processing the data through N iterations, one of the N iterations resulting in data that when displayed forms the two-dimensional image and each of the other N-1 iterations resulting in data that when displayed forms a different obfuscated version of the two-dimensional image; and,
    displaying in time-sequence a series of images including fewer than N-1 different obfuscated versions of the two-dimensional image and ending in the two-dimensional image, the series of images containing information that is insufficient for determining the secret key, given knowledge of each one of the cellular automaton rule, the data in the encoded form and the data in the non-encoded form.

12. A method according to claim 11, wherein the data that is provided in the encoded form is encoded using an encoding cellular automaton rule and the predetermined secret key.

13. A method according to claim 12, wherein the decoding cellular automaton rule is the inverse of the encoding cellular automaton rule.

14. A method according to claim 11, wherein displaying in time-sequence the series of images comprises displaying each image of the series of images within a same display portion of an electronic display device, the images being displayed one at a time to a user of the electronic display device such that the two-dimensional image coalesces at the end of displaying the series of images.

15. A method according to claim 11, comprising cropping at least some images of the series of images prior to displaying the series of images.

16. A method according to claim 11, wherein providing data in the encoded form comprises:
   receiving from a remote system, via a communications network, an electronic message comprising data that is encoded based on a predetermined secret key and according to an encoding cellular automaton rule; and,
   providing the data to a processor that is in communication with an electronic display device.

17. A method comprising:
   providing data in an encoded form, the data when displayed forming a two-dimensional image;
   using a decoding cellular automaton rule and a predetermined secret key, processing the data through N iterations, one of the N iterations resulting in data that when displayed forms the two-dimensional image and each of the other N-1 iterations resulting in data that when displayed forms a different obfuscated version of the two-dimensional image;
   cropping the obfuscated version of the two-dimensional image resulting from at least some of the N-1 iterations, so as to produce a series of cropped image; and,
   displaying in time-sequence a series of images including the series of cropped image and ending in the two-dimensional image, the series of images containing information that is insufficient for determining the secret key, given knowledge of each one of the cellular automaton rule, the data in the encoded form and the data in the non-encoded form.

18. A method according to claim 17, wherein the data that is provided in the encoded form is encoded using an encoding cellular automaton rule and the predetermined secret key.

19. A method according to claim 18, wherein the decoding cellular automaton rule is the inverse of the encoding cellular automaton rule.

20. A method according to claim 17, wherein displaying in time-sequence the series of images comprises displaying each image of the series of images within a same display portion of an electronic display device, the images being displayed one at a time to a user of the electronic display device such that the two-dimensional image coalesces at the end of displaying the series of images.

21. A method according to claim 17, wherein providing data in the encoded form comprises:
   receiving from a remote system, via a communications network, an electronic message comprising data that is encoded based on a predetermined secret key and according to an encoding cellular automaton rule; and,
   providing the data to a processor that is in communication with an electronic display device.

22. A method according to claim 21, wherein each one of the first through the penultimate processing iterations results in data that, when displayed via the electronic display device, forms an obfuscated version of the two-dimensional image.

23. A method comprising:
   receiving from a remote system, via a communications network, an electronic message comprising data that is encoded based on a predetermined secret key and according to an encoding cellular automaton rule, the data for use with an electronic display device for forming a two-dimensional image;
   using a decoding cellular automaton rule and the predetermined secret key, processing the data through a plurality of iterations to obtain the data in a non-encoded form; and,
   displaying in time-sequence, via the electronic display device, a series of images resulting from the processing, the series of images ending in the two-dimensional image and containing information that is insufficient for determining the secret key, given knowledge of each one of the decoding cellular automaton rule, the data in the encoded form and the data in the non-encoded form.

24. A method according to claim 23, wherein displaying in time-sequence the series of images comprises displaying the obfuscated version of the two-dimensional image resulting from each processing iteration of a discontinuous sub-set of the plurality of processing iterations.

25. A method according to claim 24, wherein displaying in time-sequence the series of images comprises:
   cropping the obfuscated version of the two-dimensional image resulting from at least one of the processing iterations; and,
   displaying the resulting cropped obfuscated version of the two-dimensional image as one of the images of the series of images.

26. A method according to claim 21, wherein each one of the first through the penultimate processing iterations results in data that, when displayed via the electronic display device, forms an obfuscated version of the two-dimensional image.

27. A method according to claim 23, wherein the data is processed through N iterations, and wherein the series of images includes fewer than N images.

28. A method according to claim 23, wherein the decoding cellular automaton rule is the inverse of the encoding cellular automaton rule.

29. A method according to claim 23, wherein displaying in time-sequence the series of images comprises displaying each image of the series of images within a same display portion of the electronic display device, the images being displayed one at a time to a user of the electronic display device such that the two-dimensional image coalesces at the end of displaying the series of images.

* * * * *

UNITED STATES PATENT AND TRADEMARK OFFICE
CERTIFICATE OF CORRECTION

PATENT NO. : 8,290,287 B2
APPLICATION NO. : 12/706304
DATED : October 16, 2012
INVENTOR(S) : Laurence Hamid It is certified that error appears in the above-identified patent and that said Letters Patent is hereby corrected as shown below:

In the Claims:

Column 12, line 42, claim 26, line 1, cancel the text beginning with "26. A method according to claim 21," to and ending "two-dimensional image." in column 12, line 45, and insert the following claim:

-- 26. A method according to claim 23, wherein the series of images comprises images that are based on data resulting from some of the processing iterations, each of said images being a different obfuscated version of the two-dimensional image. --

Signed and Sealed this
Third Day of September, 2013

Teresa Stanek Rea
*Acting Director of the United States Patent and Trademark Office*